United States Patent [19]

Driessen

[11] Patent Number: 4,935,770

[45] Date of Patent: Jun. 19, 1990

[54] DOCUMENT IMAGING SYSTEM COMPENSATED FOR HIGH INTENSITY BLUE SPECTRAL LAMP INTENSITY

[75] Inventor: Wilhelmus G. M. Driessen, Fairport, N.Y.

[73] Assignee: Xerox Corporation, Stamford, Conn.

[21] Appl. No.: 302,120

[22] Filed: Jan. 27, 1989

Related U.S. Application Data

[63] Continuation of Ser. No. 45,643, May 4, 1987, abandoned.

[51] Int. Cl.⁵ .................. G03B 27/72; G03G 5/00; G03G 15/01; G03G 15/04
[52] U.S. Cl. ......................................... 355/35; 355/71; 355/211; 355/229; 355/326
[58] Field of Search ................... 355/71, 77, 32, 35, 355/210, 211, 228, 229, 326, 327; 430/85, 86, 42, 46, 126; 350/311

[56] References Cited

U.S. PATENT DOCUMENTS

| | | | |
|---|---|---|---|
| 2,822,300 | 2/1958 | Mayer et al. | 117/201 |
| 3,973,960 | 8/1976 | Dulken et al. | 430/85 |
| 4,095,881 | 6/1978 | Maddox | 355/71 |
| 4,505,569 | 3/1985 | Seto et al. | |
| 4,575,228 | 3/1986 | Rightmyre | 355/71 |
| 4,640,601 | 2/1987 | Deguchi et al. | |
| 4,655,579 | 4/1987 | Adachi et al. | 355/4 |
| 4,696,880 | 9/1987 | Shoji et al. | 430/42 |
| 4,731,633 | 3/1988 | Foley et al. | 355/77 X |
| 4,742,371 | 5/1988 | Furuta et al. | 355/32 X |
| 4,770,965 | 9/1988 | Fender et al. | 430/86 X |
| 4,803,514 | 2/1989 | Hiratsuka et al. | 355/211 |
| 4,843,431 | 6/1989 | Horiguchi et al. | 355/35 X |

OTHER PUBLICATIONS

Frederick Purves et al., "The Focal Encyclopedia of Photography", The Macmillan Company: New York, 1960, p. 457.

Primary Examiner—Fred L. Braun
Assistant Examiner—Matthew S. Smith

[57] ABSTRACT

A document imaging system is disclosed which utilizes a tungsten halogen document illumination lamp in conjunction with a arsenic triselenide photoreceptor. The spectral sensitivity of the lamp and photoreceptor are matched by inserting a yellow filter into the optical path. The filter matches the spectral intensity at the blue end of the wavelength spectrum.

1 Claim, 6 Drawing Sheets

DOCUMENT IMAGING SYSTEM COMPENSATED FOR HIGH INTENSITY BLUE SPECTRAL LAMP INTENSITY

This is a continuation of application Ser. No. 07/045,643, filed May 4, 1987 now abandoned.

This invention relates to a document imaging system and, more particularly, to an imaging system in which a document is exposed by a quartz halogen lamp and an image projected onto the surface of an arsenic triselenide photoreceptor.

Document copying applications require an imaging system which operates within the visible light range. For acceptable system efficiency, document illumination lamps which operate at high color temperature in the range of 2800°-3100° K. are required. A preferred illumination source which operates in this range is a quartz tungsten halogen lamp which uses the well known halogen cycle to prevent blackening of the envelope wall during the operational cycle.

A preferred photoconductive material for copying applications has been found to consist of a drum or belt incorporating a photosensitive film consisting of an essentially homogeneous mixture of arsenic and selenium combined in well understood ratios. The spectral response of this material closely approximates the spectral response of the human eye and makes it ideal for photocopying applications.

It would be desirable to achieve the advantages of using a halogen-type lamp as a document illumination source and an arsenic triselenide material as a photoreceptor in a document imaging system. A significant problem however, exists in matching the spectral emittance of a halogen lamp with the sensitivity of the arsenic triselenide photoreceptor. Specifically, the blue spectral intensity of a tungsten halogen lamp is excessively high for an arsenic triselenide photoreceptor and results in an inability to copy documents containing, for example, low density blues and blue ballpoint pen markings. As a further problem, the output of the lamp provides an excessive amount of exposure at some wavelengths, reducing color copyability.

The present invention is therefore directed towards a document imaging system which utilizes a tungsten halogen lamp and an arsenic triselenide photoreceptor and further includes filtering means to compensate for the high blue spectral intensity and high exposure levels of the lamp output.

Figure 1:
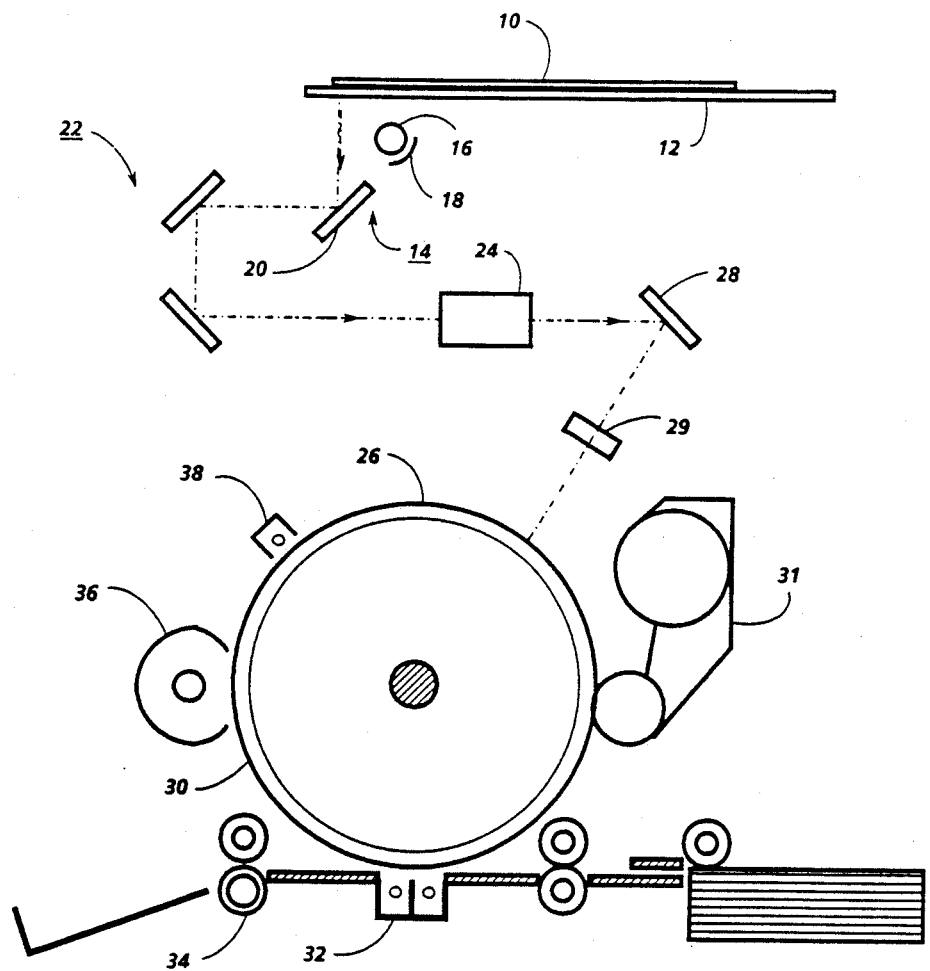
FIG. 1 is a side schematic diagram of a document imaging system, incorporating the tungsten lamp, arsenic triselenide photoreceptor and spectral matching filter of the present invention.
Figure 2:
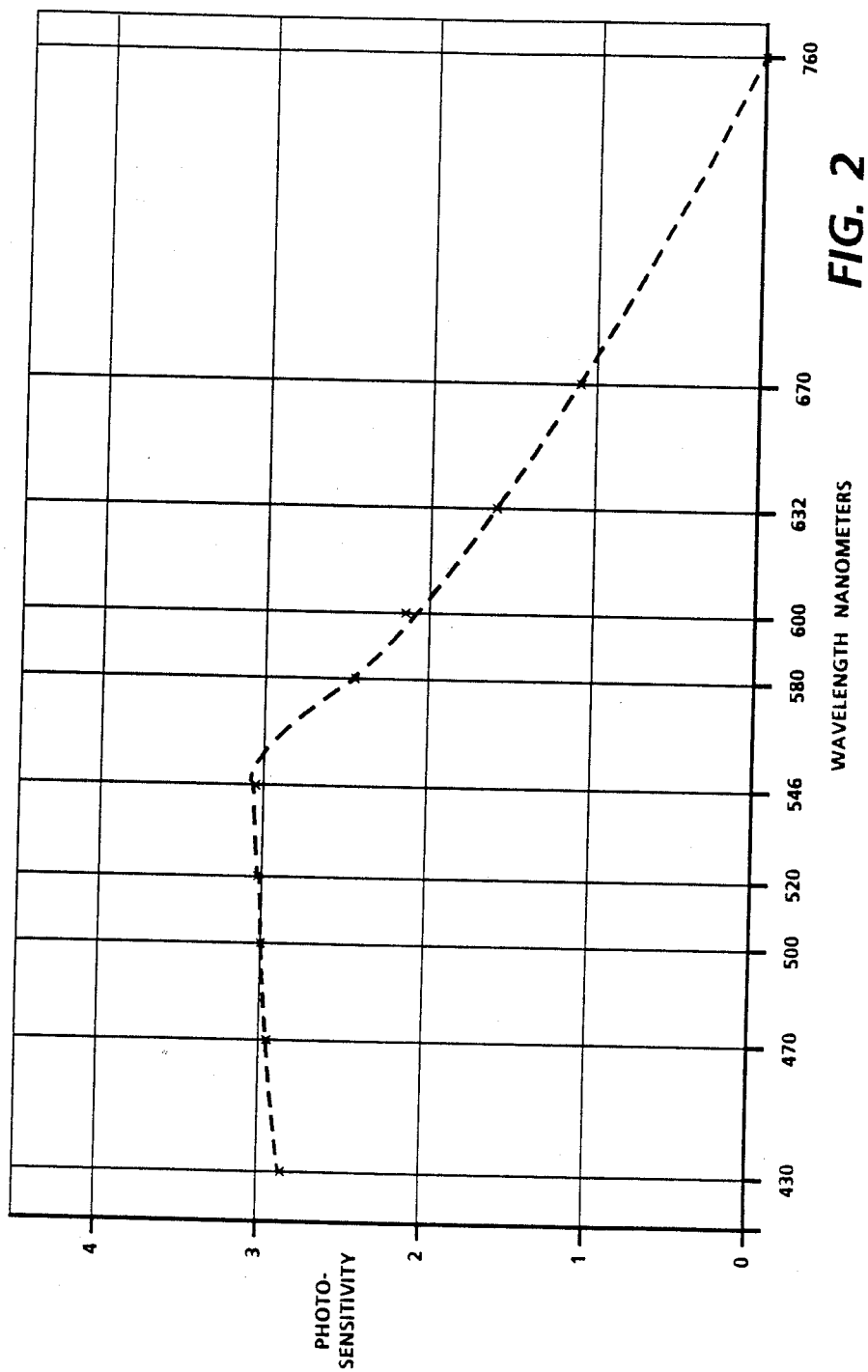
FIG. 2 is a plot of an arsenic triselenide photoconductor sensitivity over wavelength.

Turning now to the figures, FIG. 1 is a side schematic view of a document imaging system incorporating a tungsten halogen document illumination lamp and an arsenic triselenide photoreceptor. As shown, a document 10 to be copied is placed on the surface of a transparent platen 12. A scanning assembly 14 consisting of a tungsten halogen lamp 16, associated reflector 18, and scan mirror 20 are mounted for parallel movement along a scan path beneath and parallel to platen 12. Half-rate mirror assembly 22, adapted to travel at ½ the rate of mirror 20, reflects line images of the document into projection lens 24. Lens 24 projects a flowing image of the document onto the surface of drum 26 and through filter 29 whose characteristics are described more fully below. While filter 29 is shown positioned between mirror 28 and the photoreceptor, it could be located at other points along the optical path, e.g., on the object side of lens 24. The surface 30 of drum 26 is a photoreceptor which, in a preferred embodiment, is a photoconductive material consisting essentially of a homogeneous mixture of arsenic and selenium, the arsenic combination in the 30 to 40 atomic weight percentage range. U.S. Pat. No. 2,822,300 (Mayer et al) discloses an exemplary material: the contents of this patent are hereby incorporated by reference. (FIG. 2 shows the photosensitivity, over the wavelength ranges of interest, this material.) Arranged around the drum 26 are conventional xerographic processing stations: a developing station 31 for applying a toner of suitable plurality to the latent image formed on the drum surface; a transfer station 32 for transferring the developed image to an output sheet; fusing station 34 for fixing the transferred image to the copy sheet; and a charging station 38 for applying a uniform charge to the drum surface.

Figure 3:
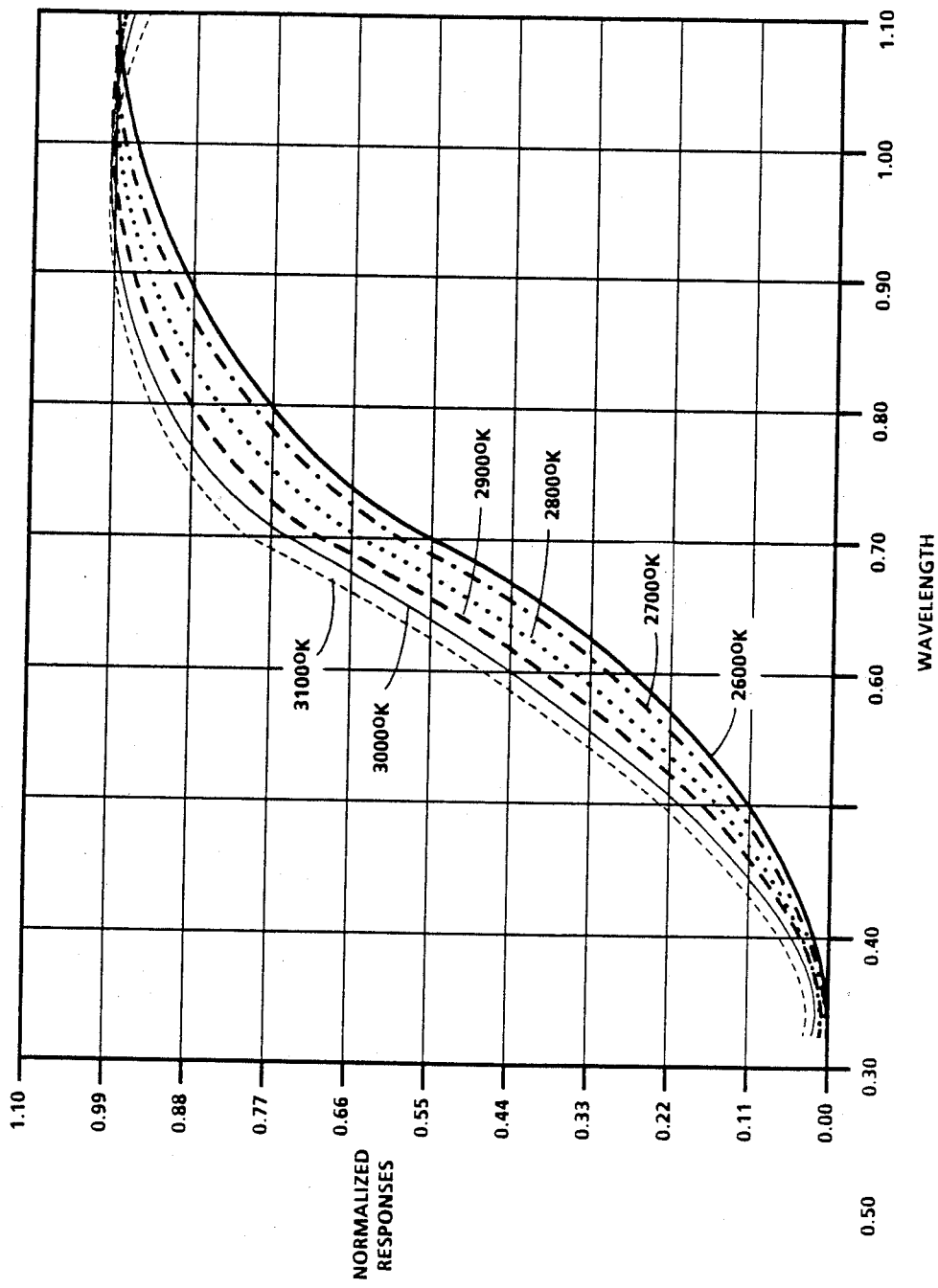
FIG. 3 is a spectral emittance plot over wavelength for a tungsten halogen lamp operating at temperatures slightly above and below 2900° K.

Turning next to a more detailed description of lamp 16, the lamp is a segmented frosted quartz halogen lamp having spectral emittance characteristics shown in FIG. 3. The emittance is given in microwatts over a wavelength range. A normal operating temperature of 2800° K. is contrasted with plots at higher and lower temperatures. These higher temperatures are reached when emittance is increased in response to document background sensing circuits indicating a document to be copied requires greater exposure levels.

Figure 4:
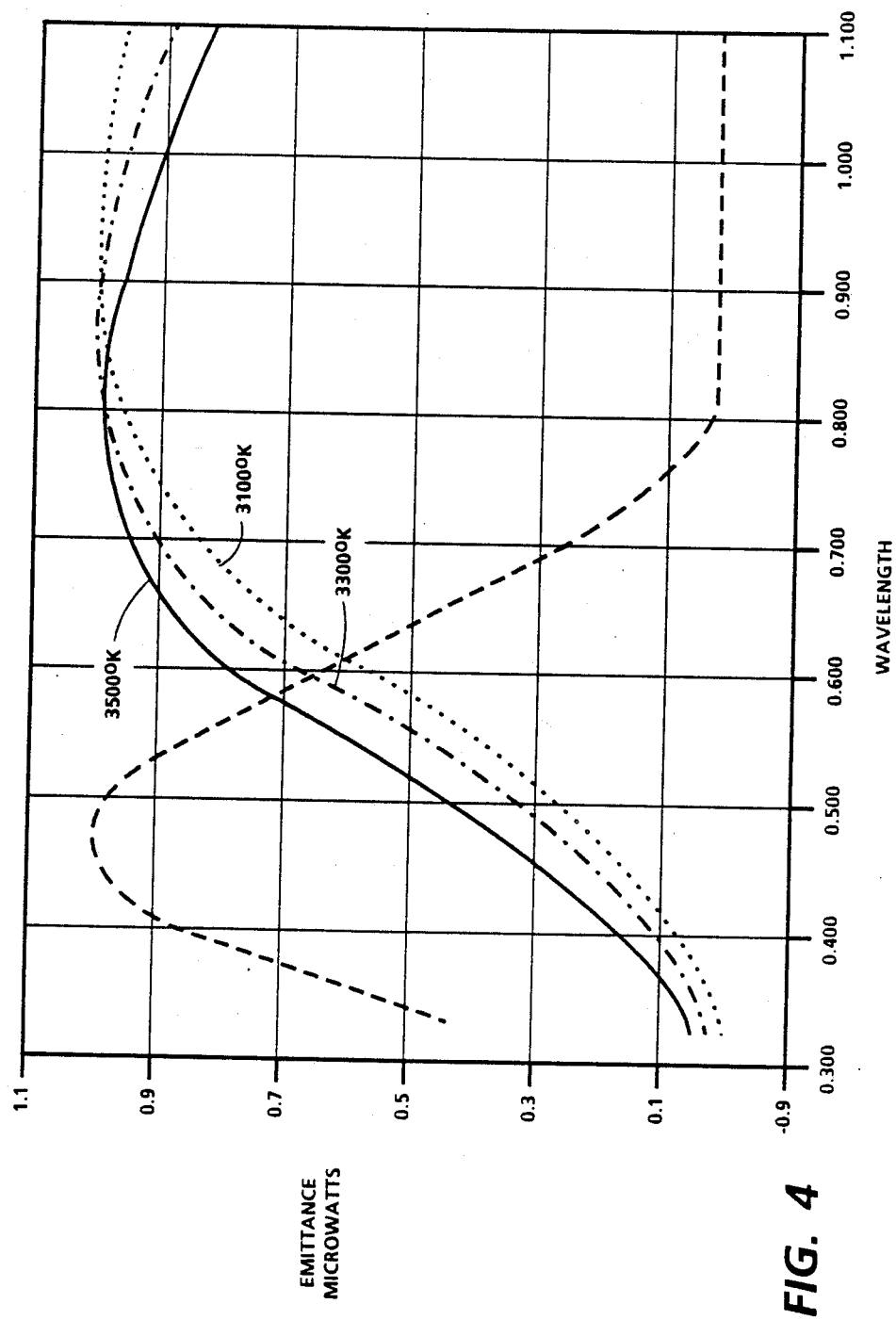
FIG. 4 represents the plot of FIG. 3 superimposed on the plot of FIG. 2.

The problem inherent in the system of FIG. 1 is demonstrated by superimposing the photosensitivity plot of FIG. 2 onto the lamp emittance plots of FIG. 3. This combination is shown in FIG. 4, the plot of the photoreceptor showing a steeper rise because of the smaller increased scale. Three observations can be made:

1. In the lower wavelength region (400-650 nm) the spectral response of the photoconductor is excessively high. At the levels shown, low density blue colors such as blue ballpoint writing would be overexposed and non-reproducible (washed out) e.g., the charged surface of the photo-receptor corresponding to the blue areas of the original document would be discharged such that no blue contrast potential would remain to be developed.

2. At the higher wavelength response, the spectral response of the lamp is complementary to the photosensitive material ensuring excellent copyability of red colors.

3. At the higher lamp temperature of 3500° F., the spectral shift is towards the lower wavelength end further impacting the blue copyability of the photoreceptor.

Figure 5:
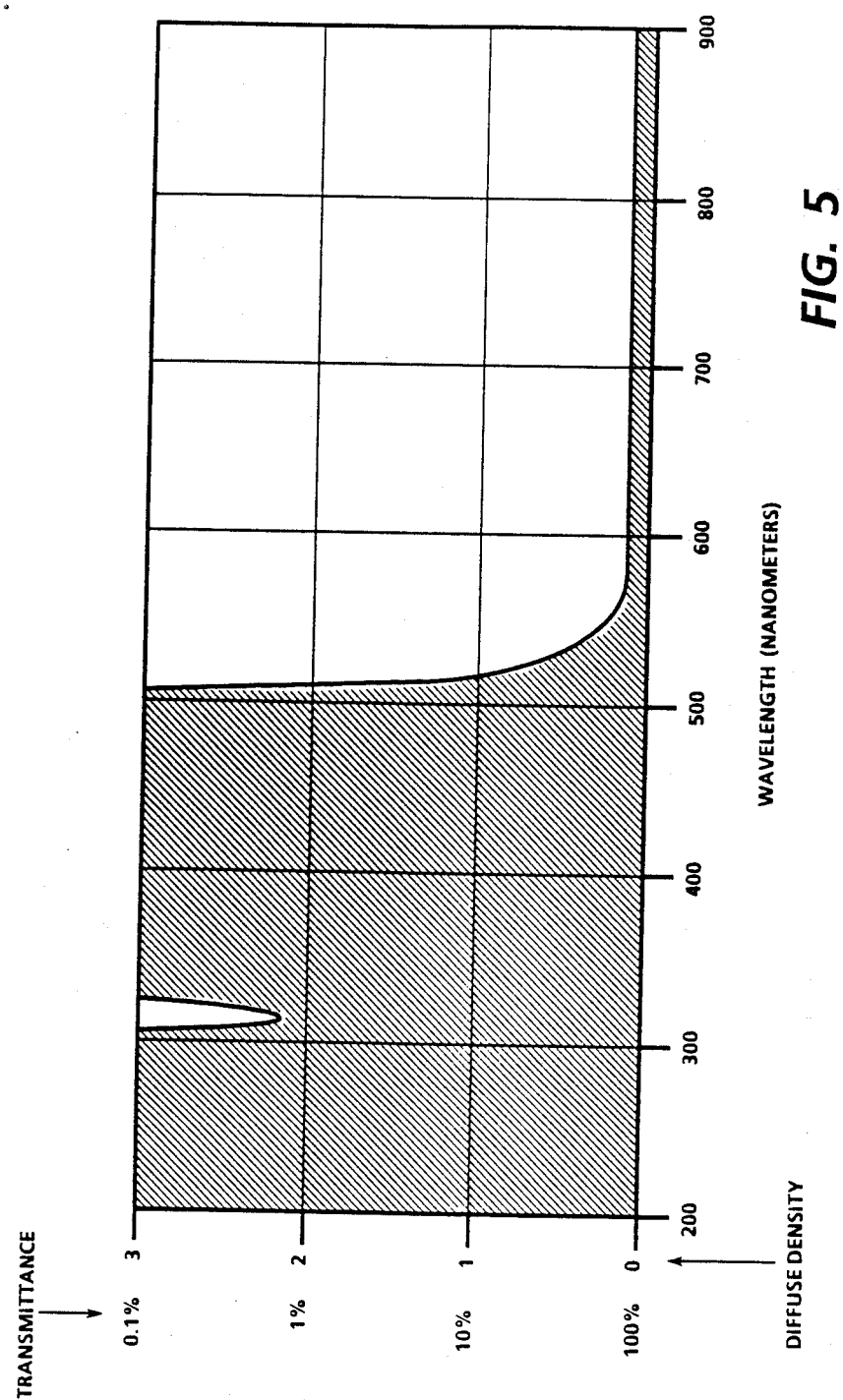
FIG. 5 is a plot of an exemplary filter transmittance over wavelength, showing absorption in the blue region.
Figure 6:
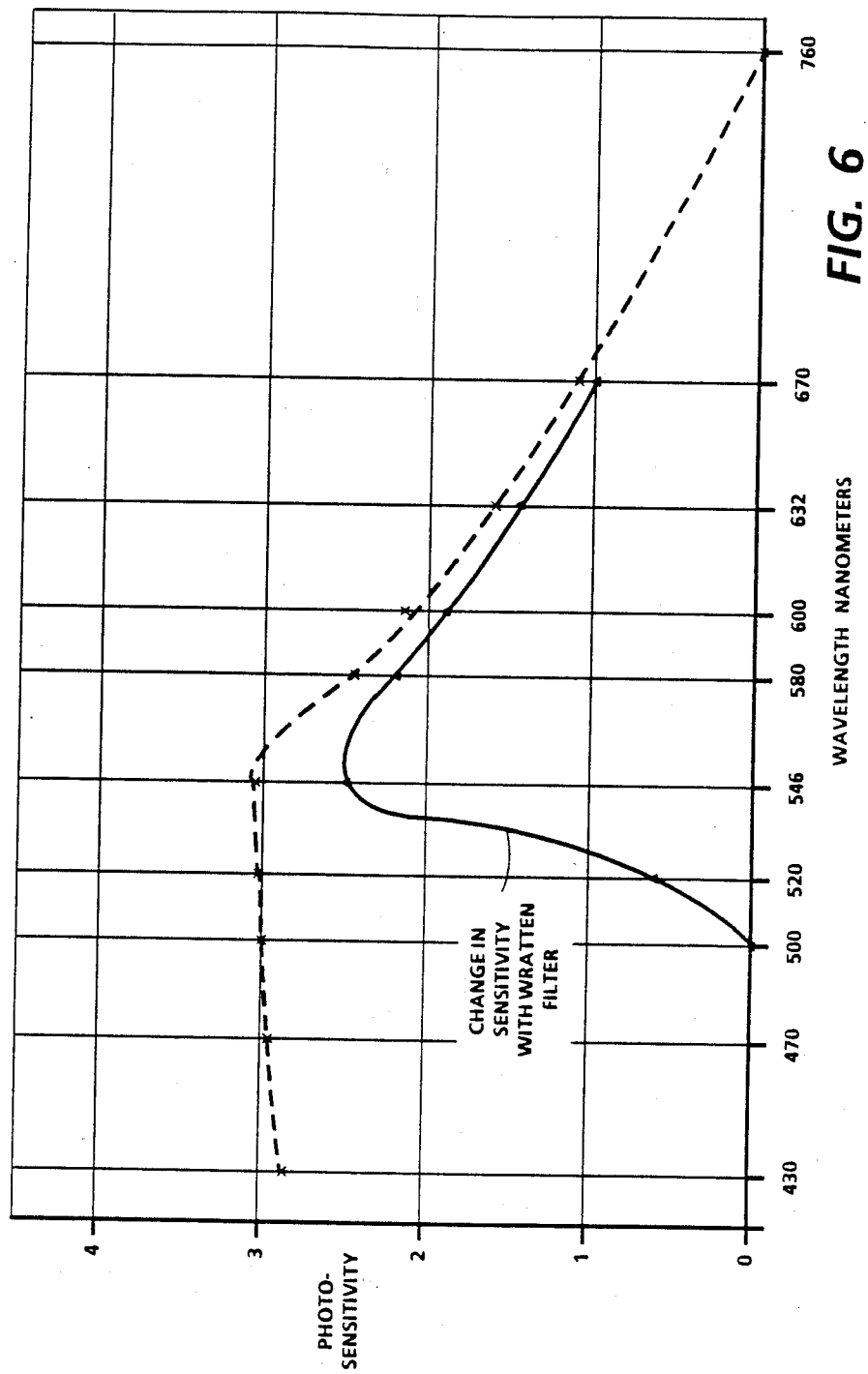
FIG. 6 shows change in photoconductor sensitivity over wavelength when using a filter with transmittance characteristics shown in FIG. 5.

It has been found that the blue copyability of the photoreceptor can be minimized by selectively reducing the spectral intensity of lamp 16 by means of filter 29. The filter selected had to meet the principal requirement of reducing the lamp intensity in the blue portion of the spectra of interest while not impacting color copyability over the remaining portions of the visible spectra. The developed image had to be free of ghosting problems and any degradation in resolution. After numerous testing of various gelatin type filters, it was determined that a filter having the characteristics of a Kodak #15 Wratten ™ filter was appropriate. This filter is a deep yellow filter used extensively in the photographic art to darken landscapes. The accompanying literature indicates that the filter is "useful for copying documents on yellowed paper". FIG. 5 shows the transmittance characteristics of the filter over the wavelength range of interest. FIG. 6 compares the arsenic triselenide characteristics over the wavelength range without (dotted line) and with (solid line) the yellow filter. FIG. 6 shows the arsenic triselenide characteristics over the wavelength range of interest. The percent transmittance at a given wavelength of filter 29 is multiplied by the sensitivity of the photoreceptor at the corresponding wavelength to show the reduction of sensitivity. FIG. 6 shows the reduction of sensitivity using values derived from Table I. As shown in the Table, Col. A is the wavelength of the filter in nanometers, Col. B in the photosensitivity of the photoconductor in $\mu\omega$ sec. cm$^2$, Col. C is the present transmittance of particular filter and Col D in the product of Col. B and C showing the effective change in sensitivity.

TABLE I

| A (wavelength nm) | SENSITIVITY CHANGE | | D (BXC) |
|---|---|---|---|
| | B (sensitivity $\mu\omega$ sec. cm$^{-2}$) | C (% transmittance) | |
| 430 | 2.85 | — | — |

TABLE I-continued

| A (wavelength nm) | SENSITIVITY CHANGE | | D (BXC) |
|---|---|---|---|
| | B (sensitivity $\mu\omega$ sec. cm$^{-2}$) | C (% transmittance) | |
| 470 | 2.95 | — | — |
| 500 | 3.00 | — | — |
| 520 | 3.00 | 0.194 | 0.582 |
| 530 | 3.00 | 0.562 | 1.686 |
| 546 | 3.00 | 0.824 | 2.472 |
| 580 | 2.45 | 0.898 | 2.200 |
| 600 | 2.15 | 0.904 | 1.944 |
| 632 | 1.6 | 0.907 | 1.451 |
| 670 | 1.1 | 0.911 | 1.002 |
| 760 | 0.1 | 0.911 | — |
| 820 | 0 | 0.911 | — |
| 850 | 0 | 0.911 | — |

While the invention has been described with reference to the structure disclosed, it is not confined to the details set forth, but is intended to cover such modifications or changes as may come within the scope of the following claims:

What is claimed is:

1. An imaging system for projecting an image of a document in an object plane onto a photoreceptor surface comprising, in combination:
   a tungsten halogen lamp operating at color temperatures within the range of 2800°–3100° K.,
   an arsenic triselenide alloy photoreceptor comprising from about 90 to 99% by weight of selenium and from about 10 to about 1% weight of arsenic;
   a projection lens for projecting an image of the document along an optical path to form a latent image of the document on said photoreceptor surface; and
   a yellow filter disposed at a point along the optical path, the filter having a transmission factor of approximately 56% of a wavelength of 530 nm increasing as a function of wavelength to 91.1% at 670 nm thereby reducing the intensity of said lamp in the blue portion of the wavelength spectrum thereby reducing the sensitivity of the photoreceptor in the blue spectral wavelength range.

* * * * *